United States Patent
Terasaki et al.

[15] 3,669,927
[45] June 13, 1972

[54] POLYCONDENSING BIS(HYDROXYALKYL) THEREPHTHALATES IN THE PRESENCE OF SMALL AMOUNTS OF A GERMANIUM COMPOUND AND A STERICALLY HINDERED BISPHENOL OR TRISPHENOL

[72] Inventors: Iwao Terasaki; Yoshio Kimura; Toshio Okamoto; Tsukasa Shima; Mitsuo Kohno; Kazuyuki Kitamura, all of Nobeokashi, Japan

[73] Assignee: Asahi Kasei Kogyo Kabushiki Kaisha, Kitaku, Osaka, Japan

[22] Filed: Jan. 5, 1970

[21] Appl. No.: 823

[30] Foreign Application Priority Data

Jan. 27, 1969 Japan.....................................44/5276
March 13, 1969 Japan..................................44/18843

[52] U.S. Cl..........................260/47 C, 57/140 R, 264/210 F
[51] Int. Cl..........................................................C08g 33/10
[58] Field of Search........................................260/47 C, 75 C

[56] References Cited

UNITED STATES PATENTS

| | | | |
|---|---|---|---|
| 2,887,468 | 5/1959 | Caldwell et al. | 260/47 C |
| 2,951,060 | 8/1960 | Billica | 260/75 |
| 3,271,365 | 9/1966 | Parham | 260/47 C |
| 3,346,541 | 10/1967 | Davies | 260/75 |
| 3,377,320 | 4/1968 | Zoetbrood | 260/75 |
| 3,413,379 | 11/1968 | Schade et al. | 260/47 C |
| 3,449,297 | 6/1969 | Schnegg et al. | 260/47 C |
| 2,578,660 | 12/1951 | Auspos et al. | 260/75 |
| 3,288,755 | 11/1966 | Griehl et al. | 260/47 C |

FOREIGN PATENTS OR APPLICATIONS

| | | | |
|---|---|---|---|
| 897,640 | 5/1962 | Great Britain | 260/47 C |
| 1,027,899 | 4/1966 | Great Britain | 260/47 C |
| 6,606,830 | 11/1966 | Netherlands | 260/75 S |

*Primary Examiner*—Howard E. Schain
*Attorney*—Fred C. Philpitt

[57] ABSTRACT

Producing of polyesters by using a germanium compound as a polycondensation catalyst, the improvement comprising effecting the polycondensation of the glycol esters obtained from aromatic dicarboxylic acids and glycols or ester-forming derivatives thereof in the presence of 0.001 to 3 percent by weight of at least one compound selected from sterically hindered bisphenols and sterically hindered trisphenols. By this method a stabilizee operation is secured and the resultant products are superior in evenness and whiteness and can be evenly and beautifully dyed.

4 Claims, No Drawings

POLYCONDENSING BIS(HYDROXYALKYL) THEREPHTHALATES IN THE PRESENCE OF SMALL AMOUNTS OF A GERMANIUM COMPOUND AND A STERICALLY HINDERED BISPHENOL OR TRISPHENOL

BACKGROUND OF THE INVENTION

This invention relates to a method for producing a polyester. More particularly it relates to an improved method for producing polyesters by using a germanium compound as a polycondensation catalyst.

Heretofore, the use of germanium compounds has been proposed in the production of polyesters having high polymerization degrees. According to U.S. Pat. No. 2,578,660, germanium compounds, particularly germanium dioxide and metallic germanium are effective as polycondensation catalysts. According to U.S. Pat. No. 3,074,913 and Japanese Pat. publication No. 12547/1967, an easily soluble germanium compound such as germanium tetrachloride, germanium alkoxide or the like is superior as a polycondensation catalyst. According to U.S. Pat. No. 3,377,320 and Japanese Pat. publication No. 13239/1968, a polycondensation catalyst of amorphous germanium dioxide gives a polyester having superior transparency and spinnability.

The above-mentioned methods by using germanium compounds as polycondensation catalyst are certainly superior in that they promote the reaction velocity to such an extent that an economical production is feasible and afford polyesters having high whiteness and clear dyeing. However, it has been proved by the inventors of the present invention that these methods for producing polyesters by using germanium compounds as polycondensation catalyst have serious drawbacks. More concretely, the fluctuation of molecular weight of the unstretched yarns spun in the melt-spinning of the resultant polyester, the fluctuation of tension during the time of stretching, the fluctuations of tenacity and elongation of stretched yarns, the reduction of yield of stretching and the generation of dyeing unevenness are observed in these methods. These drawbacks do not bring about trouble in the short period operation of general spinning and stretching steps but the fluctuations of the above-mentioned values from respective mean values come to play important roles in the long period operation. In the production of yarns, the stabilization of the above-mentioned factors becomes an important problem in order to continue a stabilized production over a long period and to give good yields of uniform yarns.

It is an object of this invention to provide a method for producing polyesters by which economical stabilized operation, less fluctuation in spinning and stretching behaviors, higher stretching yield and higher yield of products having stabilized qualities are possible.

Another object of this invention is to provide products of improved evenness, higher whiteness by which excellent dyeing evenness and beautiful, bright dyed products having no dullness can be attained.

Other and additional object of this invention will become apparent from a consideration of the following specification and claims.

SUMMARY OF THE INVENTION

According to the present invention there is provided a method for producing polyesters comprising effecting the polycondensation of the glycol esters obtained from aromatic dicarboxylic acids and glycols or the ester forming derivatives thereof in the presence of at least one compound selected from the group consisting of sterically hindered bisphenols and trisphenols by using a germanium compound as a polycondensation catalyst.

DESCRIPTION

By the method of the present invention, the above-mentioned drawbacks of the prior art processes can be overcome and the above-mentioned objects of the present invention can be attained. In commercial production, the fluctuations of various factors are a very important problem and the utmost effort is made always so as to make the fluctuation as small as possible. The method of the present invention ensures a stabilized operation and a high yield of products having stabilized qualities by controlling the production conditions which cause fluctuation factors and the advantages thereby gained can be said extremely high.

The above-mentioned effectiveness attained by the method of the present invention is extremely unique and brought about only by the combination of a germanium compound and a hindered bis- or tris-phenol. This is entirely unpredictable from known prior arts. For example, the addition of a hindered phenolic antioxidant and an ester or polyester of an acid of phosphorus in the production of polyesters is shown in British Pat. No. 1,107,832. According to the examples of this patent, it is only described that the use of an antimony compound as a polycondensation catalyst improves the heat stability of polyesters. Further according to the result of follow-up experiments carried out by the present inventors, the polyesters obtained by the method of the examples have a tone of dull gray. When the yarn obtained by spinning the said polyester is knitted and dyed, transverse stripes due to unevenness of dyeing is clearly observed, and the dyed goods have a dull tone that is far from beautiful appearance and the fluctuation of tenacity and elongation in the longitudinal direction of filaments are large.

In contrast, the effectiveness obtained by the method of the present invention is exceedingly superior. The function of the hindered bis- or tris-phenols of the present invention is utterly unique and unexpected.

Phenolic compounds other than those above-mentioned, e.g. monophenol such as cresol, 2,6-di-tertiary butyl-4-methylphenol, or p-tertiary butylphenol, unhindered bis- or tris-phenol such as 3,3'-dihydroxydiphenyl, 4,4'-butylidene-bisphenol, bisphenol A, tris(4-hydroxyphenyl)methane, 1,1,3-tris(4-hydroxypenyl) propane, 1,3,5-trimethyl-2,4,6-tris-(4-hydroxybenzyl) benzene do not show the effectiveness.

The polyester according to the present invention is mainly polyethylene terephthalate but includes polyesters obtained by substituting one or more kinds of hydroxy acids or dibasic acids such as isophthalic acid, p-hydroxybenzoic acid, diphenylsulfonedicarboxylic acid, diphenyldicarboxylic acid, diphenylether dicarboxylic acid, naphthalene dicarboxylic acid, adipic acid, sebacic acid or the like for one part or the total of the acid component of polyethylene terephthalate or by substituting one or more kinds of aliphatic, alicyclic or aromatic dihydroxy compounds such as propylene glycol, tetramethylene glycol, 1,4-cyclohexane dimethanol, bisphenol A or the like for one part or the total of the dihydroxy component of polyethylene terephthalate with a proviso that more than 60 percent (by weight) of the repetition unit of the principal chain of the polyester contains at least one aromatic ring.

Polyesters obtained by copolymerizing one or more kinds of monofunctional compound such as benzoyl benzoic acid or the like or polyfunctional compound such as glycerin, pentaerithritol, trimesic acid or the like may also be used.

As for germanium compounds used in the method of the present invention, known germanium compounds can be used without any trouble. Examples of such germanium compounds include amorphous germanium dioxide, germanium ethoxide, germanium phenoxide, germanium glycoxide, tetraphenyl germanium, germanium tetrachloride, and sodium metagermanate. These germanium compounds can be used in an arbitrary form such as aqueous solution, ethylene glycol solution, ethylene glycol dispersion or the like. When the germanium compound is to be added to the reaction system in carrying out the present invention, it is added during, before or after the ester interchange reaction and before the polycondensation in the case of the ester interchange method. In this ester interchange reaction, a commonly known ester interchange catalyst is used. In the case of the direct esterification method of a dicarboxylic acid with a glycol, followed by the polymerization, it may be added during the step of esterification but it is generally advantageous to add after the esterification of the acid with the glycol.

The amount of germanium compound used is generally in the range of from 0.005 to 0.1 percent by weight based upon the polyester, preferably in the range of from 0.01 to 0.03 percent by weight.

The sterically hindered bisphenol used in the method of the present invention means a compound having in its molecule, two phenol radicals whose hydroxy radicals are sterically hindered, and the sterically hindered trisphenol used in the method of the present invention means a compound having in its molecule, three sterically hindered phenol radicals whose hydroxy radicals are sterically hindered. Examples of suitable sterically hindered bisphenols and trisphenols include 2,2'-dihydroxy diphenyl, 2,2'-methylene-bis-(6-t-butyl-4-methylphenol), 4,4'-thio-bis-(6-t-butyl-3-methylphenol), 4,4'-butylidene-bis-(6-t-butyl-3-methylphenol), tris(3,5-di-t-butyl-4-hydroxyphenyl)methane, 1,1,3-tris(2-methyl-4-hydroxy-5-t-butylphenyl)propane, 1,1,3-tris(5-t-butyl-4-hydroxy-2-methylphenyl)butane, 1,3,5-trimethyl-2,4,6-tris(3,5-di-t-butyl-4-hydroxybenzyl)benzene and 4-methyl-2,6-bis(2-hydroxy-3-t-butyl-5-methylphenyl)phenol.

In the practice of the present invention, these hindered bisphenols and trisphenols can be added at an adequate arbitrary time of the production of polyesters. The amount of such compounds used is generally in the range of from 0.001 to 3 percent by weight based upon the polyester, preferably in the range of from 0.005 to 0.5 percent by weight.

In the practice of the present invention, a known phosphorus compounds such as phosphorous acid, triphenyl phosphite, trimethyl phosphite, phosphoric acid, triphenyl phosphate or the like, a coloring agent such as titanium oxide, carbon black or the like and other additives such as an antioxidant, a polymerization promoter can be used without any trouble.

This invention will now be illustrated by the following examples in which parts are all by weight unless expressly stated to contrary. Reduced viscosities are determined in a 1 percent by weight o-chlorophenol solution at 35° C.

Example 1 to 6 and Controls 1 to 6

One hundred ninety-four parts of dimethyl terephthalate, 136 parts of ethylene glycol, and a fixed amount of the ester interchange catalysts were mixed, heated at a temperature between 150° and 230° C and the evolved methanol was distilled off. After distilling off the methanol, 0.07 part of phosphorous acid, a fixed amount of the various polycondensation catalysts and a fixed amount of the hindered phenols were added. Thirty minutes after elevating the reaction temperature, the evacuation was initiated and after 30 minutes, the reaction temperature and the vacuum degree were ultimately 285° C and 0.3 mm Hg, respectively. After stirring for 3 hours under these conditions, the resultant polymer was taken out.

The resultant polymer was subjected to spinning under the conditions of a spinneret temperature of 290° C, a delivery pressure of 60 kg/cm² and a winding velocity of 1,200 m/min. and the resultant unstretched yarns were stretched under the conditions of a stretching velocity of 600 m/min., a stretching temperature of 80° C, a heat setting temperature of 145° C and an aimed denier of 75 d/36 fil. The frequencies of monofilament break during the stretching were shown by the number of monofilament break per 100 kg of yarns whereby expression "stretchability" was used. By extracting 100 samples at random from the resultant stretched yarns, the tenacity and elongation were measured and the mean value and standard deviation were calculated and indicated. The value of excessive standard deviation shows non-uniformity. After the resultant stretched yarns are knitted up in a cylindrical form by a circular knitting machine, the fabric was dyed in a dyeing solution containing 3 percent o.w.f. of Foron Navy SG–L, an 1g/l of a dispersing agent, Disper TL (supplied from Meisei Kasei Co., Ltd.) at 100° C for 90 minutes and the dyeing evenness of the dyed fabrics was judged by eyesight and expressed by the following grades:

I. evenly dyed and no dyeing unevenness is observed;
II. transversal stripes due to dyeing unevenness are slightly observed;
III. transversal stripes due to dyeing unevenness are clearly observed.

It is to be noted here that if the dyeing evenness is I, there is practically no problem at all with regard to dyeability of the products but if the dyeing unevenness is II or III, the unevenness of the products is not suitable for practical purposes.

The results are shown in Table 1.

Examples 7 to 13 and Control 7 to 10

Two hundred fifty four parts of bis β-hydroxyethyl terephthalate (acid value 1.000, hydroxyl value 440, Hazen number 15 at 150° C), a fixed amount of phosphorus compounds, a fixed amount of the polycondensation catalysts and a fixed amount of the hindered phenols were mixed and reacted with stirring at 280° C, under a vacuum grade of 0.3 mm Hg for 2.5 hours. The resultant polymers were tested in the same manner as in Examples 1 to 6. The results are shown in Table 2.

TABLE 1

| | Ester interchange catalyst | Part | Polycondensation catalyst | Part | Sterically hindered phenol | Part | Polymer characteristics Reduced viscosity | Softening point (° C.) |
|---|---|---|---|---|---|---|---|---|
| Example: | | | | | | | | |
| 1 | Manganese acetate tetrahydrate. | 0.04 | Germanium dioxide (amorphous). | 0.015 | 2,2'-dihydroxydiphenyl | 0.03 | 0.72 | 261 |
| 2 | do | 0.04 | do | 0.015 | 2,2'-methylenebis-(6-t-butyl-4-methylphenol). | 0.10 | 0.72 | 261 |
| 3 | Calcium acetate dihydrate | 0.06 | do | 0.015 | 4,4'-thio-bis-(6-t-butyl-3-methylphenol). | 0.15 | 0.72 | 262 |
| 4 | do | 0.06 | Ethylene glycol solution of germanium dioxide. | 0.015 | 1,1,3-tris(2-methyl-4-hydroxy-5-t-butyl-phenyl)butane. | 0.02 | 0.71 | 261 |
| 5 | do | 0.06 | Germanium ethoxide | 0.020 | 1,1,3-tris(2-methyl-4-hydroxy-5-t-butylphenyl)propane. | 0.05 | 0.72 | 262 |
| 6 | Zinc acetate | 0.04 | do | 0.020 | 1,3,5-trimethyl-2,4,6-tris(3,5-di-t-butyl-4-hydroxybenzyl)benzene. | 0.05 | 0.71 | 262 |
| Control: | | | | | | | | |
| 1 | Manganese acetate tetrahydrate. | 0.04 | Germanium dioxide (amorphous). | 0.015 | | | 0.72 | 261 |
| 2 | Calcium acetate dihydrate. | 0.06 | Germanium ethoxide | 0.020 | | | 0.71 | 262 |
| 3 | Manganese acetate tetrahydrate. | 0.04 | Germanium dioxide (amorphous). | 0.015 | 2,6-di-t-butyl-4-methylphenol. | 0.15 | 0.72 | 261 |
| 4 | Calcium acetate dihydrate. | 0.06 | Antimony acetate | 0.050 | | | 0.73 | 263 |
| 5 | do | 0.06 | Antimony trioxide | 0.040 | 2,2'-methylene-bis-(6-t-butyl-4-methylphenol). | 0.10 | 0.71 | 262 |
| 6 | do | 0.06 | do | 0.040 | 1,1,3-tris(2-methyl-4-hydroxy-5-t-butyl-phenyl)butane. | 0.05 | 0.72 | 263 |

| | Evaluation | | | | | |
|---|---|---|---|---|---|---|
| | Stretch-ability | Strength (g./d.) | | Elongation (percent) | | Dyeing evenness | Polymer color tone |
| | | Mean value | Standard deviation | Mean value | Standard deviation | | |
| Example: | | | | | | | |
| 1 | 4.3 | 5.368 | 0.068 | 22.62 | 0.685 | I | White. |
| 2 | 2.6 | 5.237 | 0.090 | 21.53 | 0.737 | I | Do. |
| 3 | 4.1 | 5,453 | 0.075 | 20.57 | 0.701 | I | Do. |
| 4 | 3.7 | 5,361 | 0.074 | 21.34 | 0.806 | I | Do. |
| 5 | 2.9 | 5.293 | 0.083 | 20.75 | 0.715 | I | Do. |
| 6 | 4.0 | 5.431 | 0.093 | 21.07 | 0.693 | I | Do. |
| Control: | | | | | | | |
| 1 | 15.3 | 5,448 | 0.201 | 22.07 | 2.16 | III | Do. |
| 2 | 14.5 | 5.275 | 0.231 | 21.31 | 1.97 | III | Do. |
| 3 | 17.0 | 5.321 | 0.219 | 20.65 | 2.07 | III | Do. |
| 4 | 10.6 | 5.441 | 0.186 | 21.65 | 1.65 | III | Dull gray. |
| 5 | 12.1 | 5.367 | 0.201 | 22.71 | 1.93 | III | Do. |
| 6 | 13.5 | 5.289 | 0.235 | 22.06 | 2.01 | III | Do. |

TABLE 2

| | Polycondensation catalyst | Part | Phosphorus compound | Part | Sterically hindered phenol | Part |
|---|---|---|---|---|---|---|
| Example: | | | | | | |
| 7 | Germanium dioxide (amorphous) | 0.01 | Phosphorous acid | 0.035 | 4-methyl-2,6-bis(2-hydroxy-3-t-butyl-5-methylbenzyl)phenol. | 0.015 |
| 8 | do | 0.01 | do | 0.035 | 4,4'-butylidene-bis-(6-t-butyl-3-methylphenol). | 0.20 |
| 9 | do | 0.01 | | | Tris(3,5-di-t-butyl-4-hydroxyphenyl) methane. | 0.05 |
| 10 | Germanium ethoxide | 0.015 | | | 4,4'-methylene-bis-(2,6-di-t-butylphenol). | 0.10 |
| 11 | Ethylene glycol solution of Germanium dioxide. | *0.01 | Phosphorous acid | 0.035 | 1,3,5-tris(3,5-di-t-butyl-4-hydroxybenzyl)benzene. | 0.03 |
| 12 | do | 0.01 | Trisnonylphenylphosphite | 0.20 | 1,1,3-tris(2-methyl-4-hydroxy-5-t-butylphenyl)butane. | 0.02 |
| 13 | do | 0.01 | Triphenylphosphite | 0.10 | Bis(3,5-di-t-butyl-4-hydroxyphenyl)phenylmethane. | 0.05 |
| Control: | | | | | | |
| 7 | Germanium dioxide (amorphous) | 0.01 | Phosphorous acid | 0.035 | | |
| 8 | do | 0.01 | | | | |
| 9 | Antimony trioxide | 0.03 | Triphenyl phosphate | 0.10 | 2,6-di-t-butyl-4-methyl-phenol. | 0.10 |
| 10 | Antimony acetate | 0.04 | Trimethyl phosphate | 0.10 | Tris(3,5-di-t-butyl-4-hydroxyphenyl)methane. | 0.05 |

*As germanium dioxide.

| | Polymer characteristics | | Evaluation | | | | | | |
|---|---|---|---|---|---|---|---|---|---|
| | Reduced viscosity | Softening point (°C.) | Stretch-ability | Strength (g./d.) | | Elongation (percent) | | Dyeing evenness | Polymer color tone |
| | | | | Mean value | Standard deviation | Mean value | Standard deviation | | |
| Example: | | | | | | | | | |
| 7 | 0.72 | 261 | 3.7 | 5.361 | 0.066 | 21.73 | 0.63 | I | White. |
| 8 | 0.72 | 260 | 4.6 | 5.279 | 0.073 | 21.64 | 0.771 | I | Do. |
| 9 | 0.71 | 261 | 3.8 | 5.433 | 0.081 | 20.09 | 0.693 | I | Do. |
| 10 | 0.71 | 262 | 3.9 | 5.350 | 0.066 | 20.73 | 0.798 | I | Do. |
| 11 | 0.72 | 261 | 4.1 | 5.281 | 0.059 | 20.65 | 0.801 | I | Do. |
| 12 | 0.72 | 261 | 4.6 | 5.377 | 0.076 | 20.93 | 0.683 | I | Do. |
| 13 | 0.72 | 262 | 5.0 | 5.403 | 0.083 | 21.31 | 0.745 | I | Do. |
| Compar.: | | | | | | | | | |
| 7 | 0.71 | 261 | 13.5 | 5.388 | 0.261 | 21.52 | 2.69 | III | Do. |
| 8 | 0.75 | 260 | 12.6 | 5.256 | 0.287 | 22.61 | 2.05 | III | Do. |
| 9 | 0.72 | 263 | 11.5 | 5.311 | 0.256 | 21.08 | 2.55 | III | Dull gray. |
| 10 | 0.73 | 263 | 10.9 | 5.276 | 0.290 | 22.33 | 2.72 | III | Do. |

* As germanium dioxide.

What is claimed is:

1. A method for producing filament-forming polyesters which comprises polycondensing a bis-(β-hydroxyalkyl) terephthalate in the presence of:
   a. 0.001 to 3 percent by weight based on the polyester of at least one sterically hindered bisphenol or trisphenol selected from the group consisting of 2,2'-dihydroxy diphenyl; 2,2'-methylene-bis-(6-t-butyl-4-methylphenol); 4,4'-thio-bis-(6-t-butyl-3-methylphenol); 4,4'-butylidene-bis-(6-t-butyl-3-methylphenol); tris-(3,5-di-t-butyl-4-hydroxyphenyl)-methane; 1,1,3-tris-(2-methyl-4-hydroxy-5-6-butylphenyl) propane; 1,1,3-tris-(5-t-butyl-4-hydroxy-2-methylphenyl)butane; 1,3,5-trimethyl-2,4,6-tris (3,5-di-t-butyl-4-hydroxybenzyl) benzene; 4-methyl-2,6-bis (2-hydroxy-3-t-butyl-5-methylphenyl) phenol, 4,4'-methylene-bis-(2,6-di-t-butylphenol); 1,3,5-tris (3,5-di-t-butyl-4-hydroxylbenzyl) benzene; and bis (3,5-di-t-butyl-4-hydroxyphenyl) phenylmethane, and
   b. 0.005 to 0.1 percent by weight of the germanium compound selected from the group consisting of amorphous germanium dioxide, ethylene glycol solution of germanium dioxide, and germanium ethoxide.

2. The method according to claim 1 wherein said bis-(hydroxyalkyl) terephthalate is bis-hydroxyethyl terephthalate.

3. The method according to claim 1 wherein said germanium compound is germanium ethoxide.

4. The method according to claim 2 wherein said germanium compound is germanium ethoxide.

* * * * *